United States Patent [19]

Chiou et al.

[11] Patent Number: 5,262,909
[45] Date of Patent: Nov. 16, 1993

[54] TAPE LOADING DEVICE FOR A MAGNETIC TAPE RECORDING AND/OR REPRODUCING APPARATUS

[75] Inventors: Chyi-Fwu Chiou; Wen-Don Lin, both of Hsinchu, Taiwan

[73] Assignee: Industrial Technology Research Institute, Hsinchu, Taiwan

[21] Appl. No.: 790,350

[22] Filed: Nov. 12, 1991

[51] Int. Cl.⁵ .......................................... G11B 15/665
[52] U.S. Cl. ................................... 360/85; 360/95
[58] Field of Search ........................ 360/85, 84, 95

[56] References Cited

U.S. PATENT DOCUMENTS

| 4,780,775 | 10/1988 | Hirose et al. | 360/85 |
| 4,868,693 | 9/1989 | Tsutsumi et al. | 360/85 |
| 4,908,723 | 3/1990 | Ohyama et al. | 360/85 |
| 4,975,793 | 12/1990 | Oka | 360/85 |
| 5,012,364 | 4/1991 | Hirayama et al. | 360/94 |
| 5,099,369 | 3/1992 | Kakuta et al. | 360/85 |

*Primary Examiner*—John H. Wolff
*Attorney, Agent, or Firm*—Ladas & Parry

[57] ABSTRACT

A tape loading device for a magnetic tape recording and/or reproducing apparatus, characterized in a mechanism having slidable plates and linkages for urging movable guide posts, movable blocks, guide rollers, a pinch roller, a tension post, and reel brakes in order to extract a length of magnetic tape from a magnetic tape cassette and moving the length of magnetic tape to various positions corresponding to various operation modes of the tape loading device.

8 Claims, 11 Drawing Sheets

TAPE LOADING DEVICE FOR A MAGNETIC TAPE RECORDING AND/OR REPRODUCING APPARATUS

FIELD OF THE INVENTION

The present invention relates to a tape loading device for a magnetic tape recording and/or reproducing apparatus, especially to a tape loading device for a magnetic tape recording and/or reproducing apparatus having a rotary head.

BACKGROUND OF THE INVENTION

In recent years, various magnetic tape cassettes applicable to recording and/or reproducing apparatus with rotary heads have been proposed. The construction of one typical magnetic tape cassette recently developed and proposed and applicable to recording and/or reproducing apparatus of the type having a rotary head is disclosed in the U.S. Pat. No. 4,908,723, published Mar. 13, 1990, U.S. Pat. No. 4,780,775, published Oct. 25, 1988, and U.S. Pat. No. 4,868,693, published Sep. 19, 1989. The recording and/or reproducing apparatus includes a rotary head, a tape loading device and so forth.

As is well known, the tape loading device extracts a length of magnetic tape from a magnetic tape cassette and moves the length of magnetic tape to a position that precisely wraps around a drum having rotary heads and drives the tape. Tape loading device generally comprises: movable guide posts, movable blocks with tilting posts, and guide rollers for extracting the length of magnetic tape and guiding the magnetic tape; a pinch roller and a capstan for controlling the tape speed; and a tension post for controlling the tension of the magnetic tape. In different operating modes, such as an unloading mode, a high speed and/or stop mode, and a playing mode for recording and/or reproducing, the different members of the tape loading device will move the extracted length of magnetic tape to various predetermined positions relative to the rotary head according to the selected operating mode of the magnetic tape recording and/or reproducing apparatus.

The conventional method for driving the different members of the tape loading device is by cam gear transmission associated with levers. For instance, in U.S. Pat. No. 4,868,693, Tsutsumi et al. use drive gears with cut-outs and lost-motion mechanisms to achieve this work. It is more clearly shown in FIG. 6 through FIG. 20d in the specification. In U.S. Pat. No. 4,780,775, Hirose et al. use cam arrangements as shown in the figures in the specification. In U.S. Pat. No. 4,908,723, Ohyama et al. utilize two loading rings which are substantially two gears. These complicated drive arrangements comprise gears and cams which lead to high manufacturing costs and extra large size, and further seriously increase the difficulty in assembling, due to the complicated phases of their gears and cams.

SUMMARY OF THE INVENTION

Therefore, it is a principle object of the present invention to provide a tape loading device without cam gear transmission.

Another and more specific object of the present invention is to provide a tape loading device with simplified compact construction for a recording and/or reproducing apparatus, which can be manufactured and assembled easily.

In the present invention, a motor drives slidable plates via reducing gears. The movable guide posts, the movable blocks, the pinch roller, and the tension post of the tape loading device are then driven by the slidable plate via simple linkages to predetermined positions according to the selected operating mode of the magnetic tape recording and/or reproducing apparatus.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE PREFERRED EMBODIMENT

Figure 1:
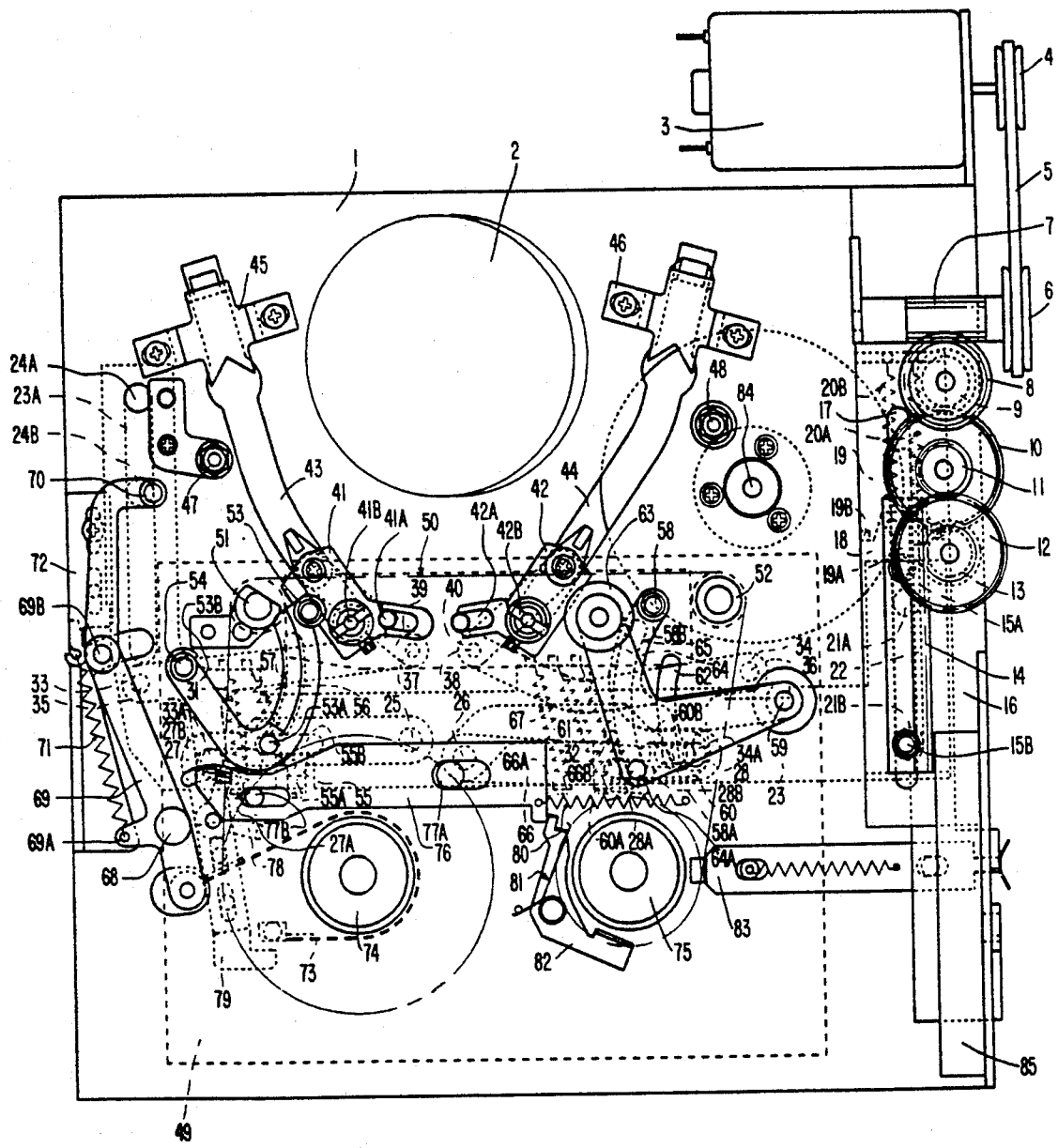
FIG. 1 is a plan view of a mechanical chassis implementing the preferred embodiment of a tape loading device for a magnetic tape recording and/or reproducing apparatus according to the invention at the unloading mode.

It should be appreciated that, throughout the disclosure given herein, the word "front" represents the section illustrated in the lower half of FIG. 1, the word "rear" represents the section illustrated in the upper half of FIG. 1, and the words "right" and "left" represent the corresponding sides, i.e. the right- and left-hand sides of FIG. 1.

Figure 2:
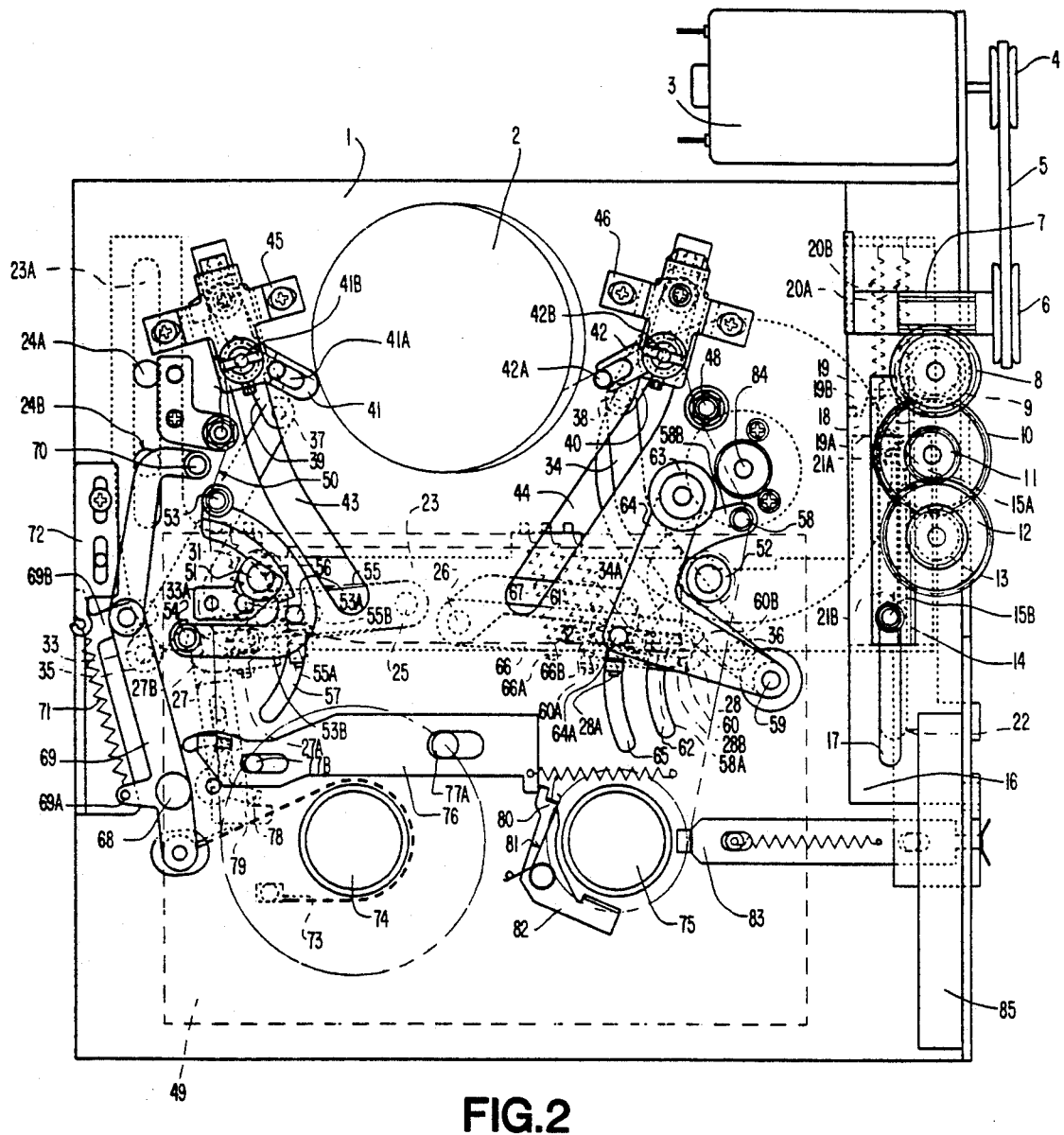
FIG. 2 is a plan view similar to FIG. 1 but in the high speed and/or stop mode.
Figure 3:
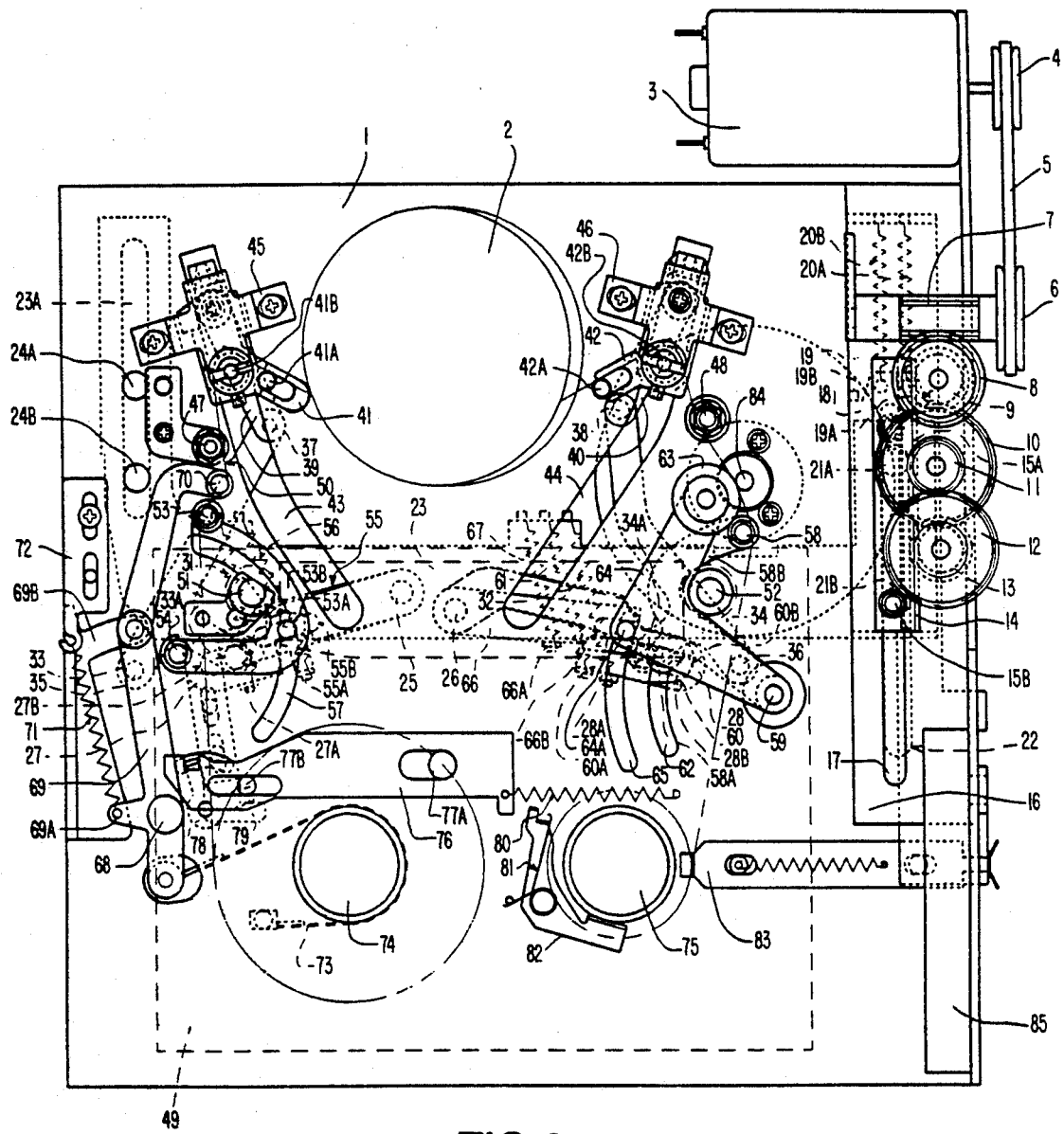
FIG. 3 is the plan view similar to FIG. 1 but in a playing mode.

Referring to FIGS. 1 to 3, the preferred embodiment of the tape loading device is mounted on a frame or chassis 1. The frame or chassis 1 is provided with a drum 2 having a rotary head (not shown) for magnetically recording and/or reproducing the information stored in a magnetic tape 50. After being loaded, the cassette 49 is positioned by means of a left positioning post 51 and a right positioning post 52. The magnetic tape 50 is pulled and guided to move from the position shown in FIG. 1 to the positions shown in FIGS. 2 and 3 to wind around the drum 2. To achieve this, there is provided a left movable connecting lever 53, a left guide roller 41B, a left tilting lever 41A, a right tilting lever 42A, a right guide roller 42B, a pinch roller 63 and a right moveable connecting lever 58. The phantom line shown in FIGS. 1, 2 and 3 indicate the positions of the magnetic tape 50 in the unloading mode, the high speed and/or stop mode, and playing mode respectively. In each mode, each part of the tape loading device will move to its predetermined location. In the unloading mode, as shown in FIG. 1, the connecting levers 53 and 58, the guide rollers 41B, 42B, the tilting levers 41A, 42A, and the pinch roller 63 are all surrounded by the magnetic tape. When the primary slidable plate 23 is driven to move in the rear direction, the connecting levers 53, 58 are driven to move, and the guide rollers 41B, 42B, and the tilting levers 41A, 42A, will also be driven to move. The magnetic tape 50 is moved by the pinch roller 63 toward the capstan 84 so that the magnetic tape 50 is sandwiched therebetween.

In a high speed and/or stop mode as shown in FIG. 2 or at a playing mode as shown in FIG. 3, a left movable guide post 53, a left guide roller 41B, a left tilting post 41A, a right tilting 42A, a right guide roller 42B, a pinch roller 63, and a right movable guide post 58 draw the magnetic tape 50 out of the cassette 49 and wrap it around the drum 2.

The different modes of the tape loading device are briefly described hereinbelow:

In the unloading mode as shown in FIG. 1, the magnetic tape 50 awaits in the cassette 49. The left movable guide post 53, the left guide roller 41B, the left tilting post 41A, the right tilting 42A, the right guide roller 42B, the pinch roller 63, and the right movable guide post 58 stand in line at their initial positions, and are surrounded by the magnetic tape 50 without contact with the magnetic tape 50.

When a primary slidable plate 23 moves in the rear direction, the tape loading device changes from the unloading mode into the high speed and/or stop mode as shown in FIG. 2. At this time, the left movable guide post 53 and the right movable guide post 58 move to their predetermined positions. The left movable block 41 with the left guide roller 41B and the left tilting post 41A moves and is positioned by contact with a left movable block seat 45. The right movable block 42 with the right tilting 42A and the right guide roller 42B moves and is positioned by contact with a right movable block seat 46.

At the high speed and/or stop mode, the tape 50 travels along a path: supply reel 74, left movable guide post 53, left stationary post 47, left guide roller 41B, left tilting post 41A, drum 2, right tilting post 42A, right guide roller 42B, right stationary post 48, right movable guide post 58, take-up reel. The path is inverted when tape 50 is rewound. The tension post 70 is not in contact with the tape 50. In tandem with the tension post 70, reel brake 73 does not contact the supply reel 74. The pinch roller 63 does not contact the tape 50, so tape 50 is not driven by capstan 84. Next to the take-up reel 75, both reel brakes 82 and 83 do not contact the take-up reel 75 as in the unloading mode. Consequently, tape 50 is completely controlled by the rotation of the supply reel 74 and the take-up reel 75 in the fast forward mode, rewind mode, or stop mode.

When the primary slidable plate 23 continues moving in the rear direction, the tape loading device changes from the high speed and/or stop mode into the playing mode as shown in FIG. 3. At this time, the left movable guide post 53, the left movable block 41, the right movable block 42 and the right movable guide post 58 stay at their predetermined positions, but the tension post 70 is now in contact with the tape 50. Cooperating with the tension spring 71 and reel brake 73, tape 50 is kept under a predetermined tension. Additionally, the pinch roller 63 presses the tape 50 against capstan 84, so tape 50 is driven under constant rotating speed by capstan 84 for recording and/or regenerating.

Braking operation on the supply reel 74 and the take-up reel 75 is different in the forward playing mode and backward playing mode respectively. In the forward playing mode, the reel brake 83 is not in contact with the take-up reel 75, and the reel brake 82 is guided to move apart from the take-up reel 75. The tension of the tape 50 is controlled by the braking operation of the reel brake 73 on the take-up reel 75.

In the backward playing mode, the tension post 70 and the reel brake 73 are caused to move away from the tape 50 and the supply reel 74 respectively, and the reel brake 83 still contacts the take-up reel 75. The reel brake 82 brakes the take-up reel 75 to maintain the tension of the tape 50 as shown in FIG. 3.

Figure 4:
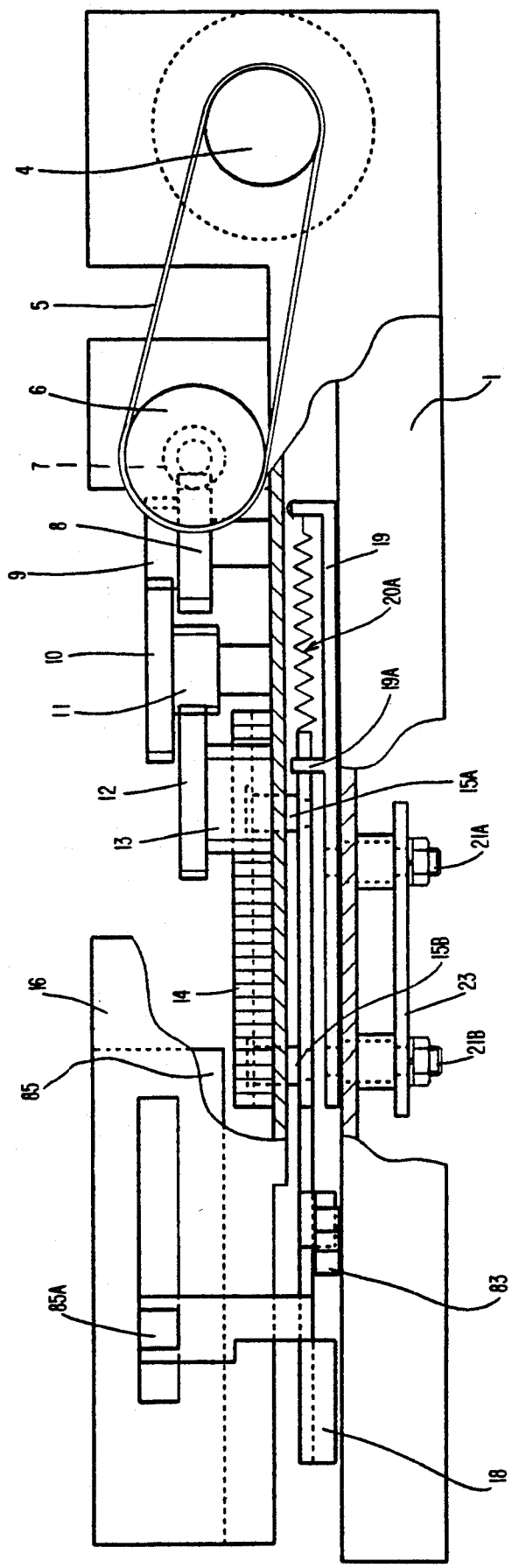
FIG. 4 is a right side elevation of the preferred embodiment, partly in section.
Figure 5:
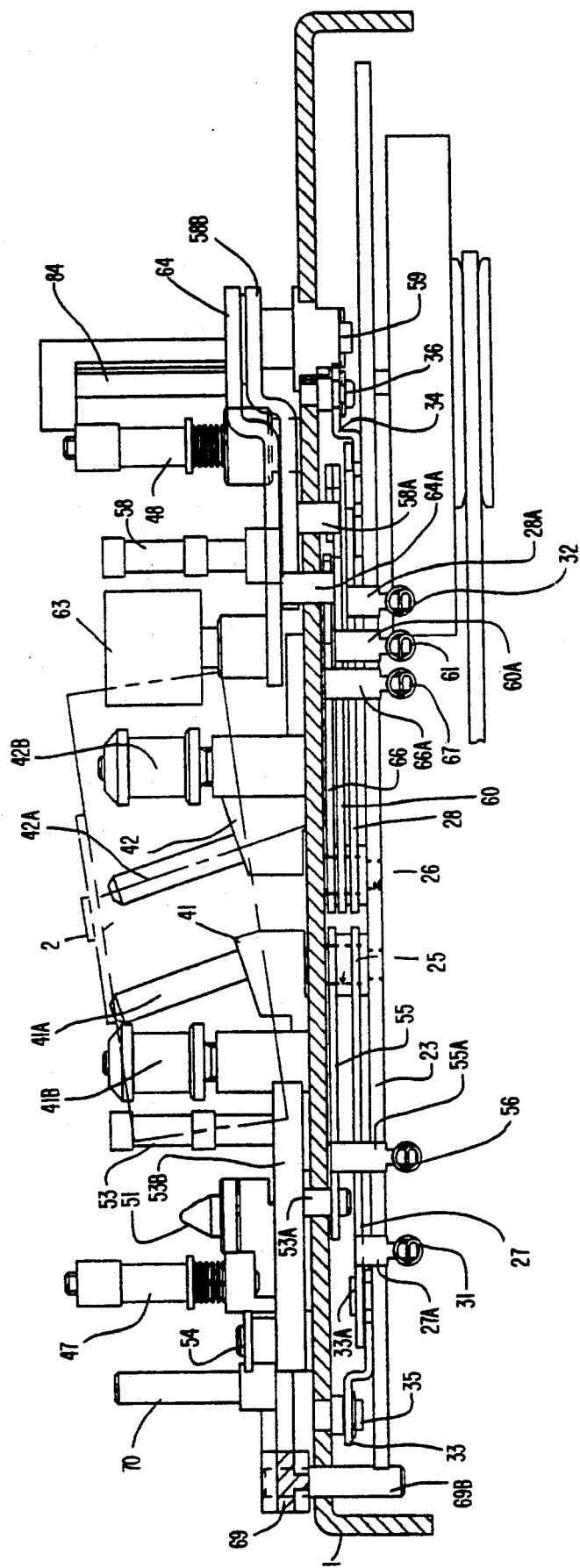
FIG. 5 is a front elevation of the preferred embodiment, partly in section.
Figure 6:
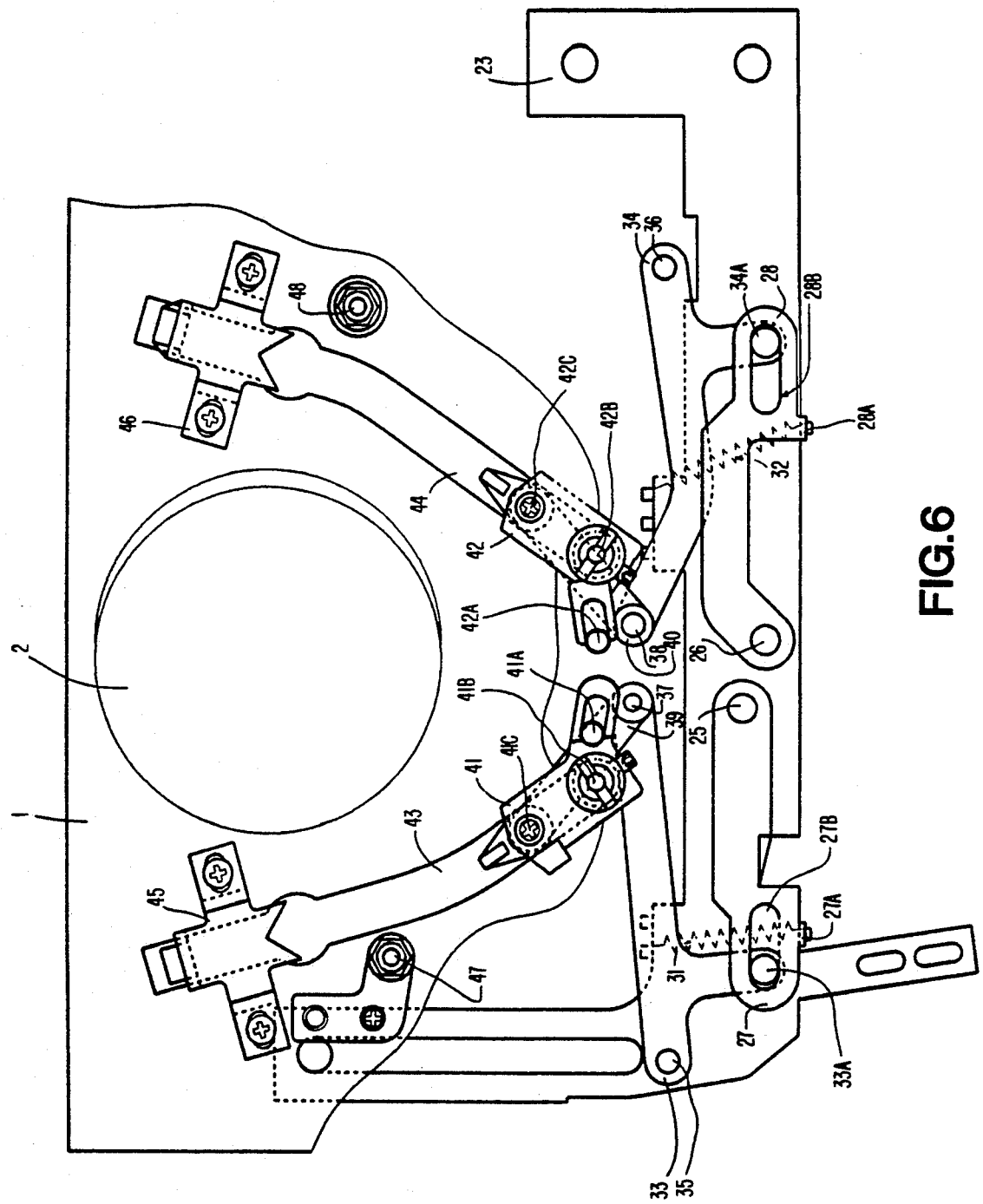
FIG. 6 is a plan view showing the movable blocks with linkages.
Figure 7:
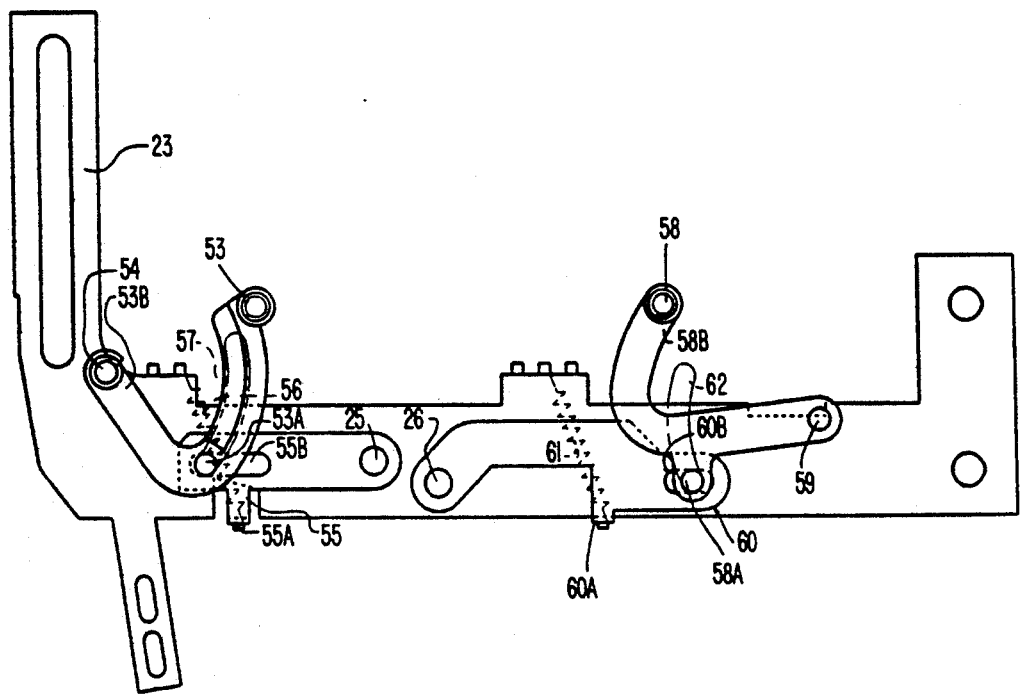
FIG. 7 is a plan view showing the movable guide posts with linkages.
Figure 8:
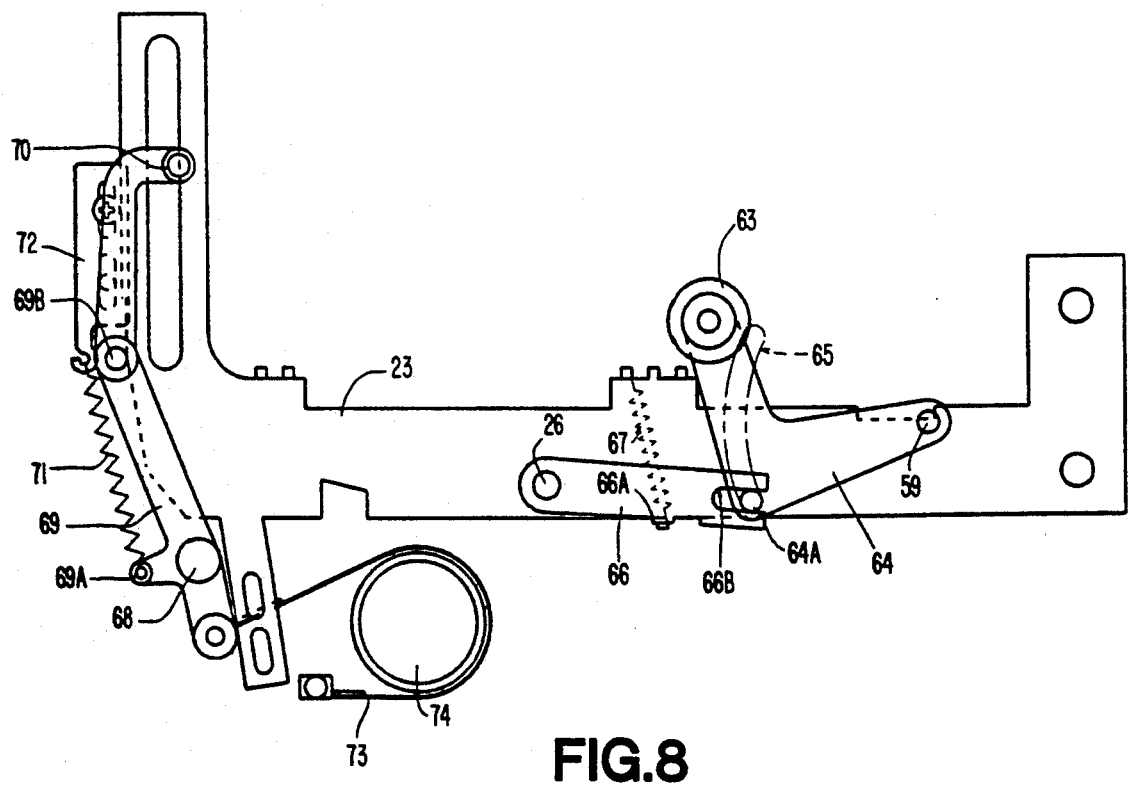
FIG. 8 is a plan view showing the capstan and the tension post with linkages.
Figure 10:
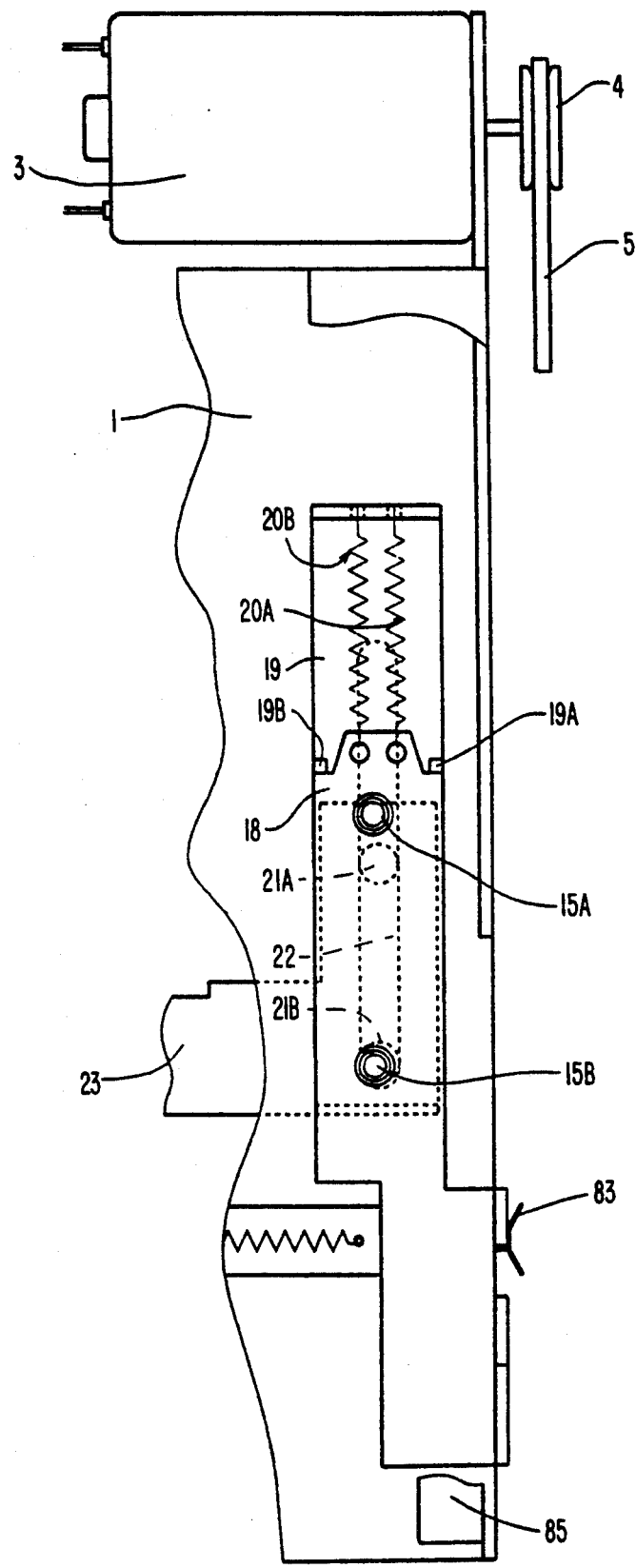
FIG. 10 is a plan view showing the first and second slidable plates.
Figure 11:
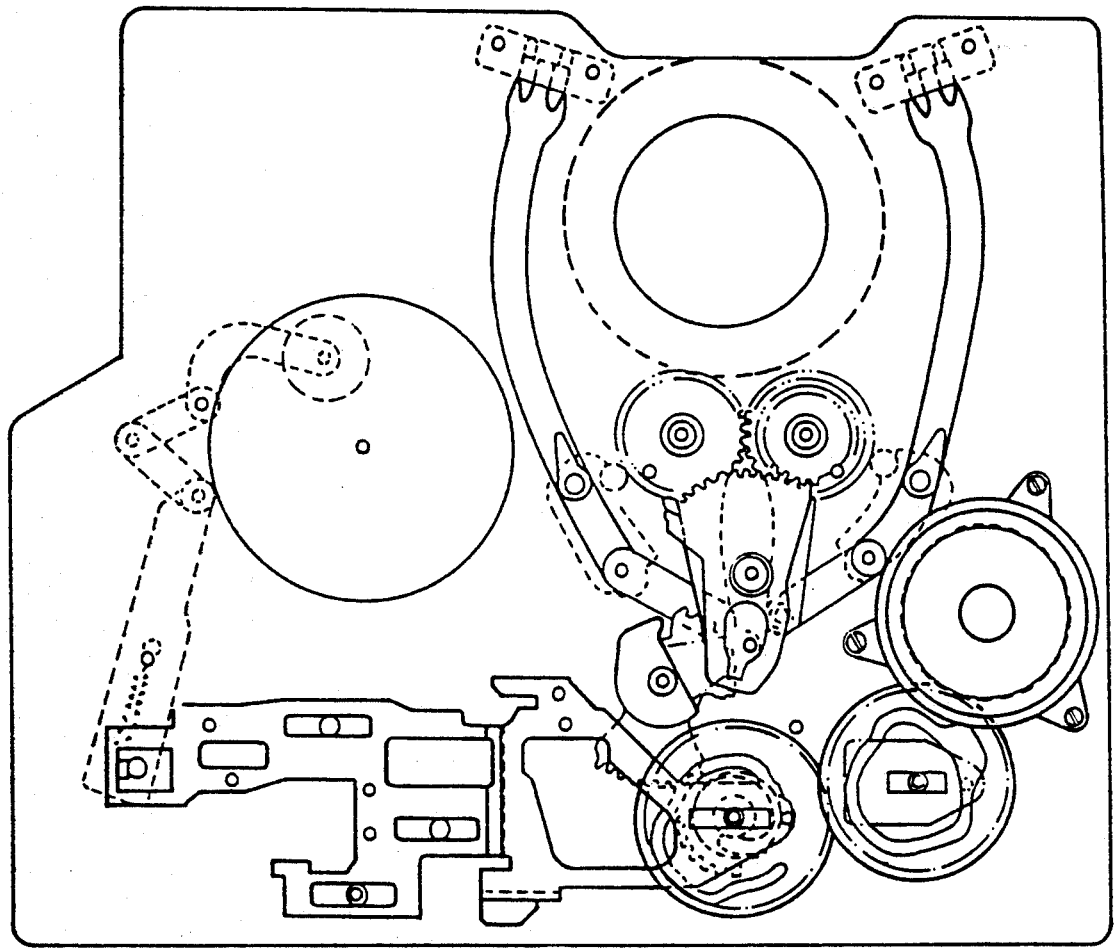
FIG. 11 is a plan view showing an example of prior arts.

As shown in FIG. 4, the rack 14 is engaged with the first slidable plate 18 by pins 15A, 15B, and the power of the motor is transmitted by way of the rack 14 to the first slidable plate 18. When moving in the rearwards direction, the first slidable plate 18 drives the second slidable plate 19 by means of protrusions 19A, 19B formed thereon (as shown in FIG. 10). The second slidable plate 19 is engaged with the primary slidable plate 23 by fixed posts 21A, 21B. In this way, power is transmitted to the primary slidable plate 23 by way of the second slidable plate 19. In other words, the primary slidable plate 23 will move in the rearward direction together with the first slidable plate 18.

The operating positions of the different members have been briefly described heretofore. The operations of the different members will be demonstrated hereinafter.

Please refer to FIGS. 1, 2, 3, and 10. The power of rotation of a driving motor 3 is transferred through a pulley 4, a belt 5, a pulley 6, a worm 7, a worm gear 8, a spur gear 9, a spur gear 10, a spur gear 11, a spur gear 12, a spur gear 13, to a rack 14 and is reduced to predetermined speed. The power is further transferred through stationary pins 15A and 15B which are accommodated to a slot 17 of a transmission chassis 16, to urge the first slidable plate 18.

When loading the tape 50, the driving motor 3 urges the first slidable plate 18 to move in the rear direction, and a second slidable plate 19 is urged by the first slidable plate 18 via protrusions 19A and 19B of the second slidable plate 19.

When unloading the tape 50, the driving motor 3 urges the first slidable plate 18 to move in the front direction, and the second slidable plate 19 is urged by the first slidable plate 18 through springs 20A and 20B. The second slidable plate 19 further urges a primary slidable plate 23 through fixed posts 21A and 21B which are accommodated to a slot 22 of the chassis 1.

Besides the slot 22 and the fixed posts 21A and 21B, the primary slidable plate 23 is also guided by guide pin 24A and 24B which are accommodated to a slot 23A of the primary slidable plate 23, for better smoothness.

The springs 20A and 20B provide another function that in the unloading mode, the second slidable plate 19 stops, but the first slidable plate 18 is still driven by the rack 14 to move in the front direction and stretches the springs 20A and 20B. In this instance, the first slidable plate 18 could be used to trigger an ejecting mechanism (not shown in the figures) for ejecting the cassette 49.

The modes of the tape loading device could be detected by sensing the position of the first slidable plate 18, because the first slidable plate 18 moves to different positions according to corresponding modes. In this embodiment, the first slidable plate 18 urges a slidable beam 85A of a position sensor 85 (shown in FIG. 4). The position sensor 85 send a signal to a controller (not shown) to control the rotation and the direction of rotation of the driving motor 3, thus causing the tape loading device to come to the mode which is set by an user.

FIGS. 1, 2, 3, 5, and 6 show the mechanisms of the left movable block 41 and the right movable block 42. The primary slidable plate 23 urges a left driving arm 27 and a right driving arm 28. The left driving arm 27 is pivoted to the primary slidable plate 23 by a pin 25 and rotates about the pin 25. The right driving arm 28 is pivoted to the primary slidable plate 23 by a pin 26 and rotates about the pin 26. The rotation of the left driving arm 27 is limited by a tension spring 31. One end of the tension spring 31 is fixed on the primary slidable plate 23, the other end is fixed on a hook 27A of the left driving arm 27 for drawing the left driving arm 27 such that the hook 27A leans on the side edge of the primary slidable plate 23 (in the unloading mode). Likewise, the rotation of the right driving arm 28 is limited by a tension spring 32. One end of the tension spring 32 is fixed on the primary slidable plate 23, the other end is fixed on a hook 28A of the right driving arm 28 for drawing the right driving arm 28 such that the hook 28A leans on the side edge of the primary slidable plate 23 (in the unloading mode).

At the time the tape loading device changes from the unloading mode to the high speed and/or stop mode, the primary slidable plate 23 is urged to move in the rear direction (toward the drum 2), and further urges the left driving arm 27 and the right driving arm 28 to rotate. The left driving arm 27 urges a rotating arm 33 via a slidable pin 33A of the rotating arm 33 accommodated to a slot 27B of the left driving arm 27. The rotating arm 33 is pivoted to the chassis 1 by a shaft pin 35 and rotates about the shaft pin 35 under the chassis 1. In the right half portion of the tape loading device, the right driving arm 28 urges a rotating arm 34 via a slidable pin 34A of the rotating arm 34 accommodated to a slot 28B of the right driving arm 28. The rotating arm 34 is pivoted to the chassis 1 by a shaft pin 36 and rotates about the shaft pin 36 under the chassis 1.

Rotating arm 33 is pivoted to a forearm 39 by a pin 37 to form an elbow. Forearm 39 is pivoted to the left movable block 41 by a pin 41C. Consequently, when the rotating arm 33 rotates, the forearm 39 will urge the left movable block 41 to move along a left guide slot 43. In a similar manner, rotating arm 34 is pivoted to a forearm 40 by a pin 38 to form an elbow. Forearm 40 is pivoted to the left movable block 42 by a pin 42C. Consequently, when the rotating arm 34 rotates, the forearm 40 will urge the right movable block 42 to move along a right guide slot 44.

Before the primary slidable plate 23 reaches a predetermined position in the high speed and/or stop mode, the left movable block 41 and the right movable block 42 are guided to touch the left movable block seat 45 and the right movable block seat 46 respectively, so as to be positioned at predetermined positions. After the left movable block 41 and the right movable block 42 are positioned at predetermined positions, rotating arms 33, 34, forearms 39, 40, the left movable block 41, and the right movable block 42 will no longer be moved when the primary slidable plate 23 moves toward the rear direction. As a result, the left driving arm 27 will rotate about the pin 25 relative to the primary slidable plate 23 because the slidable pin 33A is stopped. Therefore, the hook 27A moves away from the side edge of the primary slidable plate 23 and stretches the tension spring 31. Similarly, the right driving arm 28 will rotate about the pin 26 relative to the primary slidable plate 23 because the slidable pin 34A is stopped. Therefore, the hook 28A moves away from the side edge of the primary slidable plate 23 and stretches the tension spring 32.

The above described mechanisms are so designed that the left movable block 41 and the right movable block 42 are positioned by the left movable block seat 45 and the right movable block seat 46 before the primary slidable plate 23 moves from the position in the unloading mode to the position in the high speed and/or stop mode, and so that although the left movable block 41 and the right movable block 42 are positioned, the primary slidable plate 23 could move in the rear direction to its position in the playing mode without blockage. Additionally, the tension springs 31 and 32 provide maintaining forces for positioning the left movable block 41 and the right movable block 42 exactly.

When the primary slidable plate 23 moves from the position in the playing mode to the position in the unloading mode, the tension springs 31 and 32 retract to their original lengths at first. The hooks 27A and 28A lean on the side edge of the primary slidable plate 23 again. Rotating arms 33, 34, and forearms 39, 40 are then urged by the left driving arm 27 and the right driving arm 28 via slidable pins 33A, 34A, and slots 27B, 28B, to urge the left movable block 41 and the right movable block 42 toward their initial positions in the unloading mode. At last, the left movable block 41 and the right movable block 42 reach the ends of guide slots 43, 44 and stop, then the primary slidable plate 23 is stopped.

FIGS. 1, 2, 3, 5, and 7 show the mechanisms of the left movable guide post 53 and the right movable guide post 58. The primary slidable plate 23 urges a left driving arm 55 and a right driving arm 60. The left driving arm 55 is pivoted to the primary slidable plate 23 by the pin 25 and rotates about the pin 25. The right driving arm 60 is pivoted to the primary slidable plate 23 by the pin 26 and rotates about the pin 26. The rotation of the left driving arm 55 is limited by a tension spring 56. One end of the tension spring 56 is fixed on the primary slidable plate 23, the other end is fixed on a hook 55A of the left driving arm 55 to draw the left driving arm 55 such that the left movable guide post 53 is drawn near the left guide roller 41B as possible without interference.

Referring further to FIGS. 9A to 9D, the left movable guide post 53 is designed to fit with the left movable block 41 closely as described hereinafter. The left movable guide post 53 is fixed on a rotating arm 53B.

Figure 9A:
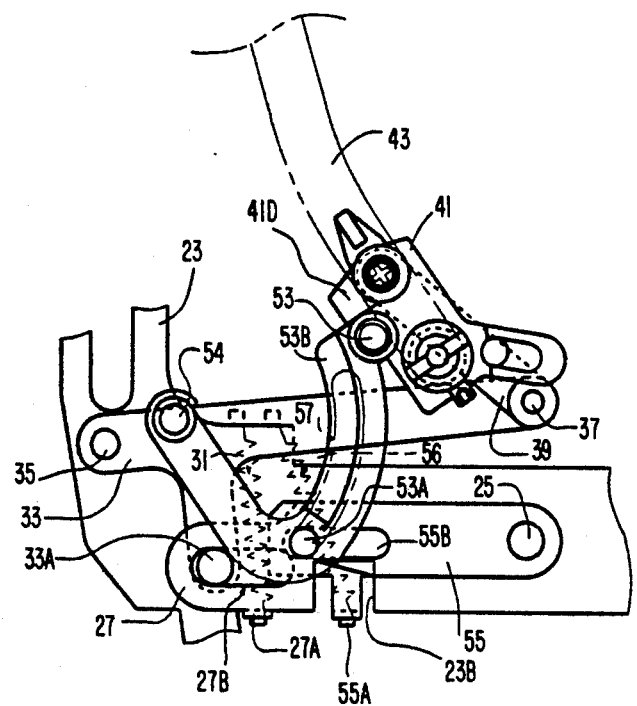
FIGS. 9A to 9D show the relationship between the left movable block and the left movable guide post when tape is being loaded.

The left driving arm 55 urges the rotating arm 53B and the left movable guide post 53 via a slidable pin 53A of the rotating arm 53B accommodated to a slot 27B of the left driving arm 55. The rotating arm 53B is pivoted to the chassis 1 by a shaft pin 54 and rotates about the shaft pin 54 under the chassis 1. As shown in FIGS. 1 and 9A, The rotating arm 53B abuts against a protrusion 41D of the left movable block 41 at its initial position in the unloading mode. When the primary slidable plate 23 moves from its position in the unloading mode to its position in the high speed and/or stop mode, the rotating arm 53B is urged to rotate through a position shown in FIG. 9B to a position shown in FIG. 9C while pushing the protrusion 41D. At this time, the protrusion 41D of the left movable block 41 moves away from the rotating arm 53B, and the hook 55A leans on a notch 23B formed on the edge of the primary slidable plate 23. After that, the left movable guide post 53 is no longer blocked by the protrusion 41D. The slidable pin 53A is accommodated to and slides in a slot 57 which is formed on the chassis 1. Before the primary slidable plate 23 reaches its working position in the high speed and/or stop mode, the slidable pin 53A is stopped by an end of the slot 57, and the left movable guide post 53 reaches its working position in the high speed and/or stop mode and in the playing mode. After that, the left movable guide post 53 will no longer be moved when the primary slidable plate 23 moves toward the rear direction. As a result, the left driving arm 55 will rotate about the pin 25 relative to the primary slidable plate 23 because the slidable pin 53A is stopped. Therefore, the hook 55A moves away from the side edge of the primary slidable plate 23 and stretches the tension spring 56. The above described mechanisms are so designed that although the left movable guide post 53 is stopped, the primary slidable plate 23 could move in the rear direction without blockage. Additionally, the tension spring 56 provides maintaining forces for positioning the left movable guide post 53 exactly in the high speed and/or stop mode and in the playing mode.

Figure 9B:
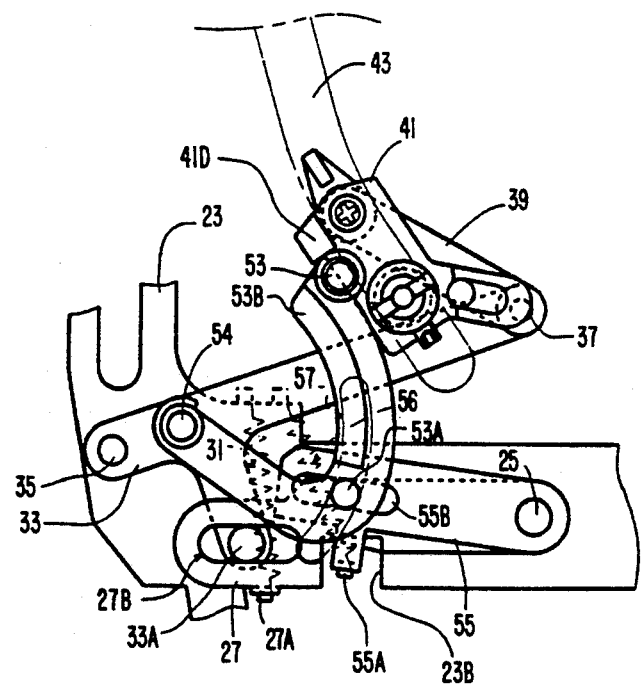
Figure 9C:
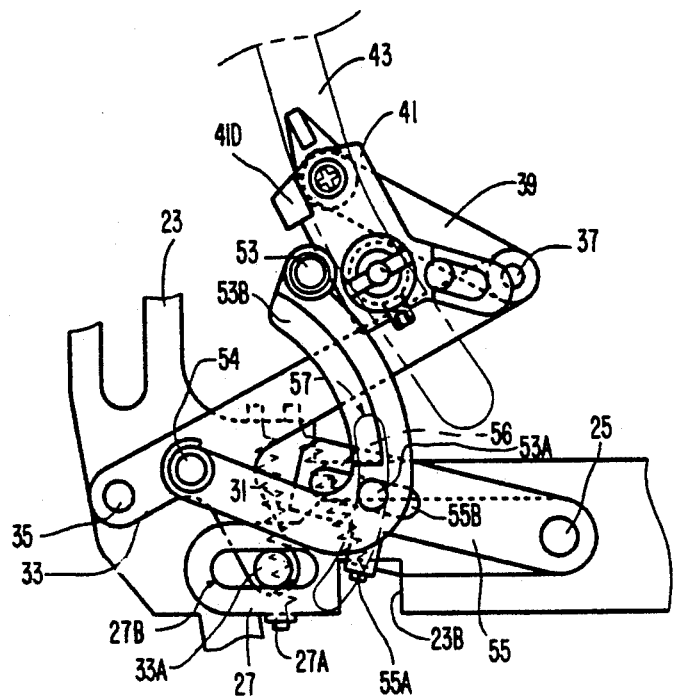
Figure 9D:
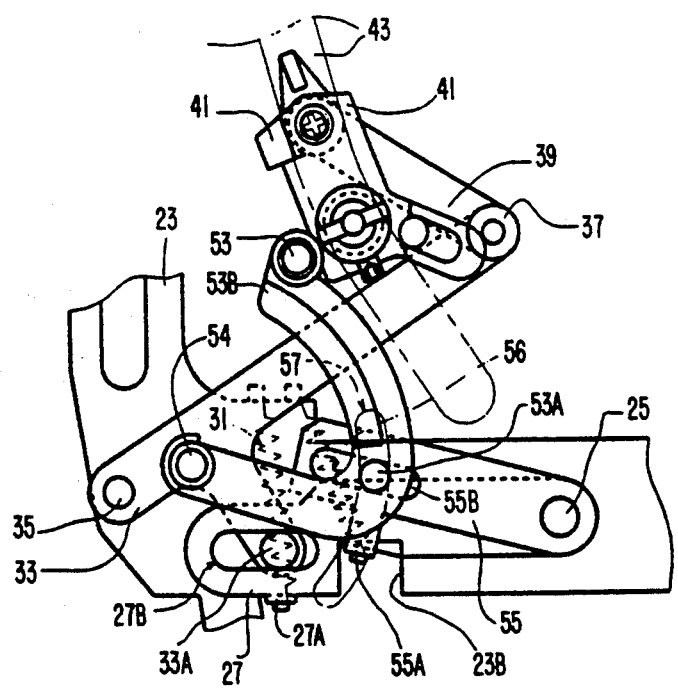

When the primary slidable plate 23 moves from the position in the high speed and/or stop mode to the position in the unloading mode, the tension spring 56 retracts to its original length at first. The hook 55A leans on the notch 23B again. Rotating arm 53B is then urged by the left driving arm 55 via the slidable pin 53A and the slot 55B, to urge the left movable guide post 53 toward its initial position in the unloading mode. After the primary slidable plate 23 passes its position in the high speed and/or stop mode, the left movable guide post 53 and the left movable block 41 will reach a state shown in FIG. 9D. Before the primary slidable plate 23 reaches its initial position in the unloading mode, the protrusion 41D of the left movable block 41 touches and pushes the rotating arm 53B, and further urges the hook 55A of the left driving arm 55 to move away from the notch 23B, as shown in FIG. 9B. At last, the left movable guide post 53 is guided to its initial position in the unloading mode shown in FIG. 9A.

Now refer to FIGS. 1, 2, 3, 5, and 7 that illustrate the mechanisms of the right movable guide post 58. One end of a tension spring 61 is fixed on the primary slidable plate 23, the other end is fixed on a hook 60A of the right driving arm 60 for drawing the right driving arm 60 to lean on the side edge of the primary slidable plate 23. A rotating arm 58B is pivoted to the chassis 1 by a shaft pin 59 and rotates about the shaft pin 59. The right movable guide post 58 is mounted on the rotating arm 58B and rotates with the rotating arm 58B. When the primary slidable plate 23 moves from its position in the unloading mode to its position in the high speed and/or stop mode, the right driving arm 60 is urged to move with the primary slidable plate 23. The rotating arm 58B is urged in turn to rotate with the right movable guide post 58 via a slidable pin 58A accommodated to a slot 60B of the right driving arm 60. Before the primary slidable plate 23 reaches its working position in the high speed and/or stop mode, the slidable pin 58A is stopped by an end of the slot 62 of the chassis 1, and the right movable guide post 58 reaches its working position in the high speed and/or stop mode and in the playing mode. After that, the right movable guide post 58 will no longer be moved when the primary slidable plate 23 moves toward the rear direction. As a result, the right driving arm 60 will rotate about the pin 26 relative to the primary slidable plate 23 because the slidable pin 58A is stopped. Therefore, the hook 60A moves away from the side edge of the primary slidable plate 23 and stretches the tension spring 61. The above described mechanism is so designed that although the right movable guide post 58 is stopped, the primary slidable plate 23 can move in the rear direction without blockage. Additionally, the tension spring 61 provides maintaining forces for positioning the right movable guide post 58 exactly in the high speed and/or stop mode and in the playing mode.

When the primary slidable plate 23 moves from its position in the high speed and/or stop mode to its position in the unloading mode, the tension spring 61 retracts to its original length at first. The hook 60A leans on the side edge of the primary slidable plate 23 again. Rotating arm 58B is then urged by the right driving arm 60 via the slidable pin 58A and the slot 60B, to urge the right movable guide post 58 toward its initial position in the unloading mode. At last, the slidable pin 58A is stopped by an end of the slot 62, and the right movable guide post 58 is guided to its initial position in the unloading mode.

Please refer to FIGS. 1, 2, 3, 5, and 8, which show the mechanism of the pinch roller 63. Similar to those stated before, the driving arm 66 is pivoted to the primary slidable plate 23 by the pin 26 and rotates about the shaft pin 26. The rotating arm 64 is pivoted to the chassis 1 by the shaft pin 59 and rotates about the shaft pin 59. The pinch roller 63 is mounted on the rotating arm 64. One end of a tension spring 67 is fixed on the primary slidable plate 23, the other end is fixed on a hook 66A of the left driving arm 66 for drawing the left driving arm 66 such that the hook 66A leans on the side edge of the primary slidable plate 23 at its initial position in the unloading mode. When the primary slidable plate 23 moves from its position in the unloading mode to its position in the high speed and/or stop mode, the driving arm 66 is urged to move with the primary slidable plate 23, and further urges the rotating arm 64 to rotate via a slidable pin 64A accommodated to a slot 66B. In the high speed and/or stop mode as shown in FIG. 2, the pinch roller 63 does not come in contact with the capstan 84. When the primary slidable plate 23 moves from its position in the high speed and/or stop mode to its position in the playing mode, the pinch roller 63 is urged to press the tape 50 against the capstan 84. Consequently, the pinch roller 63, the rotating arm 64, and the pin 64A reach their working positions in the playing mode. The capstan 84 rotates at a constant speed to drive the tape 50 at a predetermined speed smoothly.

Before the pinch roller 63 reaches its working position in the playing mode, the hook 66A is drawn by the tension spring 67 to lean on the side edge of the primary slidable plate 23. After the pinch roller 63 reaches its working position in the playing mode, the driving arm 64 will rotate about the pin 26 relative to the primary slidable plate 23 because the slidable pin 64A is stopped. Therefore, the hook 66A moves away from the side edge of the primary slidable plate 23 and stretches the tension spring 67. The above described mechanisms are so designed that although the pinch roller 63 is stopped, the primary slidable plate 23 can move in the rear direction without blockage. Additionally, the tension spring 67 provides maintaining force for positioning the pinch roller 63 exactly in the playing mode.

When the primary slidable plate 23 moves from its position in the playing mode to its position in the unloading mode, the tension spring 67 retracts to its original length at first. Then hook 66A leans on the side edge of the primary slidable plate 23 again. The rotating arm 64 and the pinch roller 63 are then urged by the driving arm 66 via the pin 64A and the slot 66B, to urge the rotating arm 64 and the pinch roller 63 toward their initial positions in the unloading mode. At last, the pin 64A is stopped by an end of the slot 65, and the primary slidable plate 23 is stopped.

The mechanism of the tension post 70 is discussed hereinbelow. The tension post 70 is mounted on a driving arm 69. Driving arm 69 is pivoted to the chassis 1 by a shaft pin 68 and rotates about the shaft pin 68. A pin 69B is mounted on the driving arm 69. One end of a tension spring 71 is fixed on a branch 69A of the driving arm 69, the other end is fixed on a hook of a tension adjusting member 72 for drawing the driving arm 69 such that the pin 69B leans on the side edge of the primary slidable plate 23 (in the unloading mode).

The pin 69B moves toward the right direction when the primary slidable plate 23 moves toward the rear direction. When the primary slidable plate 23 reaches its position in the playing mode, the side edge of the primary slidable plate 23 leaves the pin 69B and the tension post 70 presses the tape 50 to maintain the tension of the tape 50. If the tension of the tape 50 is too high, the tape 50 will push the tension post 70 counterclockwise and release the reel brake 73 from the supply reel 74 to reduce the tension of the tape 50, and vice versa. When the primary slidable plate 23 moves to its position in the unloading mode, the side edge of the primary slidable plate 23 urges the tension post 70 to its initial position in the unloading mode via the pin 69B.

The mechanism of the brake 82 and 83 is stated hereinbelow. When the primary slidable plate 23 moves from its position in the unloading mode to its position in the playing mode, the primary slidable plate 23 will urge a rib 79 which urges a crank arm 78. Crank arm 78 further urges a control beam 76. The control beam 76 is slidably positioned on the chassis 1 by two pins 77A and 77B. The brake 82 is controlled by the movement of the control beam 76 in the right or left direction. As shown in FIGS. 1 and 2, the rib 79 does not make contact with the crank arm 78 in the unloading mode and the high speed and/or stop mode. A tension spring 80 draws the control beam 76 in the right direction, so the brake 82 is urged to leave the take-up reel 75. When the primary slidable plate moves from its position in the high speed and/or stop mode to its position in the playing mode, the rib 79 will move with the primary slidable plate 23 and urges the crank arm 78 to pull the control beam 76 in the left direction. Therefore, the tension spring 80 is stretched and the control beam 76 leaves the brake 82. Consequently, the brake 82 is urged by a torsional spring 81 to brake the take-up reel 75.

The brake 83 is directly controlled by the first slidable plate 18 as shown in FIGS. 1 to 4. When the primary slidable plate 23 moves between the its position in the unloading mode and its position in the high speed and/or stop mode, the brake 83 is urged by the first slidable plate 18 to brake the take-up reel 75, so that the tape is supplied by the supply reel 74 in the loading process. In the unloading mode, the high speed and/or stop mode, and the playing mode, the first slidable plate 18 draws the brake 83 to leave the take-up reel 75.

As described hereinbefore, the present invention is characterized in a primary slidable plate which moves in the longitudinal direction, i.e. the front or rear direction of the tape loading device for urging the movable guide posts, and the movable blocks via simple linkages to predetermined positions according to the selected operating mode of the magnetic tape recording and/or reproducing apparatus, and for extracting a length of magnetic tape from the magnetic tape cassette and moving the length of magnetic tape to a position that precisely wraps around the drum having rotary heads. The primary slidable plate further urges the pinch roller to press the tape against the capstan, to drive the tape smoothly at a predetermined speed. The tension post and the brake are urged by the primary slidable plate, to contact with the tape for controlling the tension of the tape in the playing mode. Additionally, the brakes for controlling the take-up reel are urged by the primary slidable plate cooperating with the rib. In conclusion, the present invention utilizes a slidable plate to control the entire operation of the tape loading device, which increases the stability and reliability of the tape loading device.

Another characteristic of the present invention is the utilization of tension springs and driving arms. The tension springs provide maintaining forces for positioning the different members in different modes, and avoid blocking the primary slidable plate when some members reach their working position before the primary slidable plate reaches its working position.

Furthermore, to avoid interference and for reducing the overall dimension, a protrusion on the left movable block is provided for controlling the left movable guide post in order that the left movable block and the left movable guide post can be separately urged from their initial positions in the unloading mode to their working positions in sequence, and vice versa.

It should be noted that, although the present invention is applied to one of the tape loading devices with rotary heads, it also could be applied to other types of the tape loading devices. Consequently, the preferred embodiment stated before does not limit the scope of the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A tape loading device for a magnetic tape (50) in a magnetic tape cassette (49), the device comprising:

(a) a frame (1) having guide means (43, 44) thereon;

(b) at least one guide post (53, 58) for extracting the magnetic tape from the magnetic tape cassette and guiding the magnetic tape;

(c) at least one block member (41, 42) slidably mounted on the guide means (43, 44);

(d) at least one tilting post (41A, 42A) mounted on the block member for extracting the magnetic tape from the magnetic tape cassette and guiding the magnetic tape;

(e) at least one guide roller (41B, 42B) mounted on the block member for extracting the magnetic tape from the magnetic tape cassette and guiding the magnetic tape;

(f) a capstan (84) mounted on the frame for driving the magnetic tape;

(g) a pinch roller (63) cooperating with the capstan for controlling the speed of the tape;

(h) a tensioning member (70) pivotally mounted on the frame for controlling the tension of the magnetic tape;

(i) a primary slidable plate (23) slidably mounted on the frame, the slidable plate being operatively connected by connecting means with the guide post, block member, and pinch roller, wherein the slidable plate is moveable in a direction whereby the guide post, block member and pinch roller are urged into various positions, to move the tape into various positions corresponding to various operating modes of the tape loading device.

2. A tape loading device as claimed in claim 1 wherein the tensioning member is pivoted by movement of the primary slidable plate.

3. A tape loading device as claimed in claim 2 further comprising a first slidable plate (18) and a second slidable plate (19), the first and second slidable plates being capable of ejecting the magnetic tape cassette.

4. A tape loading device as claimed in claim 3, further comprising a motor (3) for urging the second slidable plate through a series of reducing gears (4-13).

5. A tape loading device as claimed in claim 4, further comprising springs between the primary slidable plate and the connecting means, the springs facilitating the positioning of the guide post, block member and pinch roller.

6. A tape loading device as claimed in claim 5 further comprising a position detector for detecting the various operation modes of the tape loading device.

7. A tape loading device as claimed in claim 6 wherein at least one of the block members has a protrusion (41D) for controlling the guide post associated therewith to minimize interference between the block member and the guide post.

8. A tape loading device as claimed in claim 7 wherein the connecting means comprises driving arm, one end of the driving arm being pivotally connected to the slidable plate and another end of the driving arm having a slot and a hook; rotating arms, one end of the rotating arm being pivoted to the frame, each rotating arm having a slidable pin received in the slot of each driving arm respectively; and forearms, one end of each of the spring is fixed to the slidable plate, another end of the spring being fixed to the hook of the driving arm, the guide post and pinch roller are mounted on the rotating arms, each block member is pivoted to one end of the forearm respectively, another end of each forearm being pivoted to the rotating arm.

when the primary slidable plate moves along the direction that the tape is extracted, the primary slidable plate urges the guide post, block member and pinch roller via the springs, the driving arms, the rotating arms and the forearms, and when the guide post, block member and pinch roller reach predetermined positions and stop, the primary slidable plate is capable of stretching the springs and continuing to move without obstruction.

* * * * *